United States Patent
Sekiya et al.

(10) Patent No.: US 7,411,886 B2
(45) Date of Patent: *Aug. 12, 2008

(54) DEVICE AND METHOD OF RECORDING INFORMATION ON AN OPTICAL DISC

(75) Inventors: Harutaka Sekiya, Sendai (JP); Yuichiro Tomishima, Miyagi Pref. (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 324 days.

This patent is subject to a terminal disclaimer.

(21) Appl. No.: 11/283,834

(22) Filed: Nov. 22, 2005

(65) Prior Publication Data

US 2006/0077837 A1    Apr. 13, 2006

Related U.S. Application Data

(60) Continuation of application No. 10/876,674, filed on Jun. 28, 2004, now Pat. No. 6,999,402, which is a division of application No. 09/840,152, filed on Apr. 24, 2001, now Pat. No. 6,791,923.

(30) Foreign Application Priority Data

Nov. 5, 2000    (JP) .............................. 2000/139091

(51) Int. Cl.
    *G11B 7/00* (2006.01)
(52) U.S. Cl. .................................. 369/116; 369/47.51
(58) Field of Classification Search ................ 369/116, 369/47.51, 47.53, 47.55, 121, 122
    See application file for complete search history.

(56) References Cited

U.S. PATENT DOCUMENTS

| 6,061,317 A | 5/2000 | Shodo |
| 6,999,402 B2 * | 2/2006 | Sekiya et al. ............... 369/116 |

FOREIGN PATENT DOCUMENTS

| EP | 0 905 685 | 3/1999 |
| JP | 4-62518 | 5/1992 |
| JP | 4-65218 | 5/1992 |
| JP | 06-342527 | 12/1994 |
| JP | 10-008365 | 1/1998 |
| JP | 10-208365 | 8/1998 |
| JP | 11-149641 | 6/1999 |
| JP | 2001-176107 | 6/2001 |

\* cited by examiner

*Primary Examiner*—Ali Neyzari
(74) *Attorney, Agent, or Firm*—Staas & Halsey LLP

(57) ABSTRACT

A device for recording information on an optical disc so as to improve the recording quality of the information when a recording operation has just started. The recording device includes a luminous element radiating a light for recording information on the optical disc; a radiation intensity controller constantly controlling an intensity of radiation of the light radiated by the luminous element; a constant outputting unit providing a constant energy to the luminous element; a selector selectively selecting one of the outputs of the intensity of radiation controller and the constant outputting unit; wherein, the selector selects the output from the constant outputting unit during a predetermined duration from a starting time of recording the information on the optical disc, and selects the output from the intensity of radiation controller afterward.

8 Claims, 3 Drawing Sheets

DEVICE AND METHOD OF RECORDING INFORMATION ON AN OPTICAL DISC

CROSS-REFERENCE TO RELATED APPLICATIONS

This application is a continuation application of U.S. application Ser. No. 10/876,674 filed Jun. 28, 2004, now U.S. Pat. No. 6,999,402 which application was a divisional of U.S. application Ser. No. 09/840,152, filed Apr. 24, 2001, now issued as U.S. Pat. No. 6,791,923, the disclosures of which are incorporated by reference.

This application claims the benefit of Japanese Application No. 139091/2000, filed May 11, 2000, in the Japanese Patent Office, the disclosure of which is incorporated herein by reference.

BACKGROUND OF THE INVENTION

1. Field of the Invention

The present invention relates to a device for recording information on an optical disc, and in particular, to a device and method of recording information on an optical disc while controlling an intensity of radiation of a light beam radiating on the optical disc so as to record the information.

2. Description of the Related Art

In a conventional device for recording information on an optical disc, an intensity of radiation of a light beam radiating on an optical disc is fed back to maintain the intensity of the radiation of the light beam as constant regardless of a temperature variation and the like.

FIG. 1 is a block diagram of the conventional device for recording information on the optical disc. In FIG. 1, an intensity of the radiation of a light beam (laser) radiating on the optical disc is fed back to maintain the intensity of the radiation of the light beam as constant. That is, the intensity of radiation of a laser radiated from a laser luminous element 59 is monitored by a laser output monitoring unit 54, a subtractor 55 compares a monitoring value output from the laser output monitoring unit 54 with a reference value outputted form a reference voltage generator 53, and the laser driver 58 controls an outputted driving current to conform with the two values and thereby maintain the intensity of radiation of the laser radiated from the laser luminous element 59 as constant.

Also, in the conventional recording device shown in FIG. 2, a reference voltage generator 53 outputs a reference value and the feedback loop is started through self operation, thereby starting the recording (writing) operation for the optical disc, if the recording signal output from a recording signal generator 51 is varied from a low (L) level to a high (H) level.

However, a predetermined time is required until the intensity of radiation of the light beam (laser) reaches the reference value after operating the feedback loop, since a response delay occurs in the feedback loop in the related art. That is, the intensity of radiation of the laser is still at a value smaller than the reference value just after the recording has started, because the feedback loop has just begun operating. So, the recording of the information is initially performed with an intensity of radiation of the light beam smaller than the reference value until the intensity of radiation of the light beam rises from the initial value to the reference value during the predetermined time. Specially, the intensity of radiation of the light beam is smaller than that intended for recording the information when the recording operation has just started.

Accordingly, there is a drawback in that the intensity of radiation of a light beam radiating on an optical disc does not reach the necessary intensity of radiation, resulting in the recording of information which is inferior in quality by producing errors in the recording of the information or non-recording of the information (non-recording areas).

SUMMARY OF THE INVENTION

It is, therefore, an object of the present invention to provide a device and method of recording information on an optical disc, which improves the recording quality of the information when the recording operation has just started.

Additional objects and advantages of the invention will be set forth in part in the description which follows, and, in part, will be obvious from the description, or may be learned by practice of the invention.

To achieve the above and other objects, there is provided a device for recording information on an optical disc, comprising a luminous element radiating a light having recording information on the optical disc; a radiation intensity controller constantly controlling an intensity of radiation of the light radiating from the luminous element; a constant outputting unit providing a constant energy to the luminous element; a selector selectively selecting one of the outputs of the intensity of radiation controller and the constant outputting unit; wherein, the selector selects the constant outputting unit during a predetermined duration from a starting time of recording the recording information on the optical disc, and selects the intensity of radiation controller afterward.

It is desirable that the energy provided from the constant outputting unit to the luminous element is determined based on a testing record in the optical disc. Typically, an optical disc drive which records information on optical discs such as CD-R and CD-RW perform a test writing called optimum power control ("OPC") to determine an optimal write power. The discs provide a testing area (OPC area). Although use of this area depends on the drive, a typical drive uses the area as follows.

A test writing is performed at some laser power. Then, the written signal is read and the power dependency of the signal quality is obtained. Then, the power of best quality is selected at the optimal power or the optimal power is calculated using extrapolation. A testing record in the optical disc is performed in the sequence mentioned above. Generally, the optimal power depends on the disc type and many drives perform the OPC before recording of the information when the disc is changed. In the present invention, a laser is driven with constant voltage for a predetermined period of time. The temperature dependence of the optimal power is small, but the laser character greatly changes according to the changing temperature. This means that the intensity of radiation at the predetermined period varies with the temperature. Avoiding this difficulty, the OPC is performed when the temperature varies over the predetermined level and the constant voltage level is then redetermined.

It is also desirable that the testing record is performed when a temperature detector equipped in the recording device detects a temperature variation.

To also achieve the above and other objects, there is provided a method of recording information on an optical disc by radiating a light provided from a luminous element, the method comprising providing a constant energy to the luminous element during a predetermined duration from a starting time of recording the recording information on the optical disc; and controlling an intensity of radiation radiating from the luminous element to be constant afterward.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

A preferred embodiment of the present invention will be described herein below with reference to the accompanying drawings. In the following description, well-known functions or constructions are not described in detail since they would obscure the invention in unnecessary detail.

Figure 1:
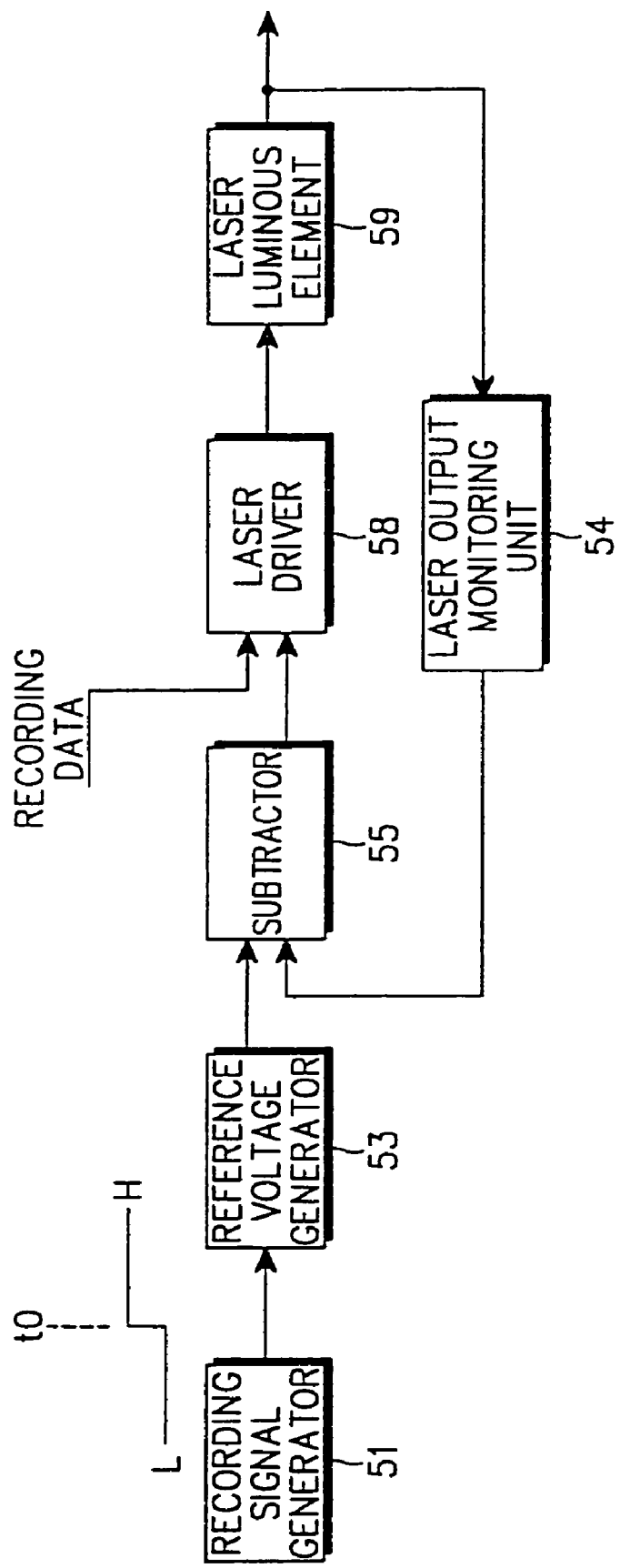
FIG. 1 is a block diagram of a conventional device for recording information on an optical disc according to the related art.
Figure 2:
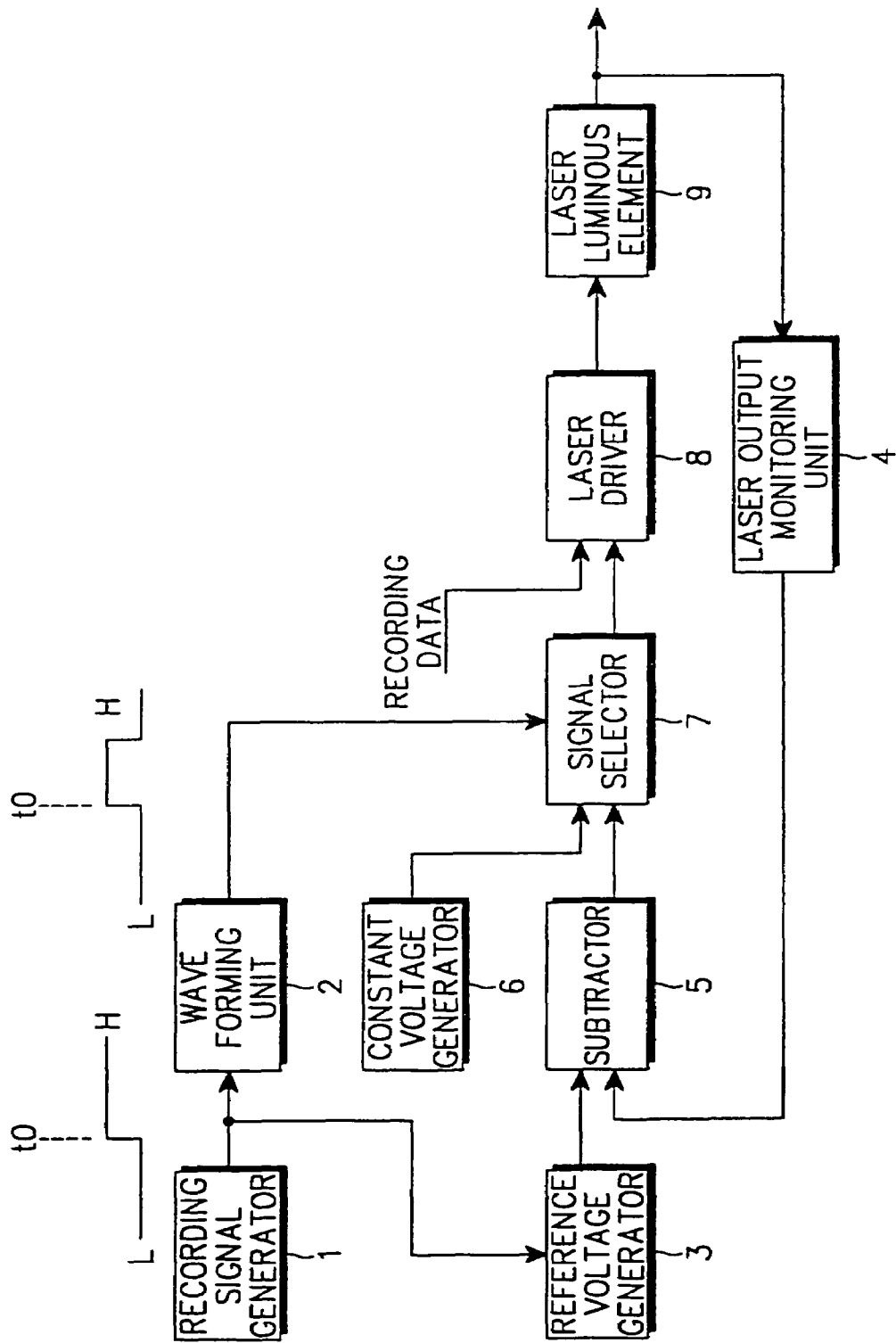
FIG. 2 is a block diagram of a device for recording information on an optical disc according to an embodiment of the present invention.

FIG. 2 is a block diagram of a device for recording information on an optical disc according to an embodiment of the present invention. Referring to FIG. 2, a recording signal generator 1 generates and outputs a recording signal. In the device for recording information on the optical disc according to the present invention, if the recording signal output from the recording signal generator 1 is changed from a low (L) level to a high (H) level, information recording on the optical disc is started.

The recording signal output from the recording signal generator 1 is input to a wave forming unit 2 and a reference voltage generator 3, respectively. The wave forming unit 2 outputs a selection signal depending on the recording signal. That is, if the recording signal is changed from the L level to the H level at the time t0, the selection signal is also changed from the L level to the H level at the time t0 and then returns to the L level after maintaining the H level for a predetermined time. The reference voltage generator 3 generates and outputs the reference voltage representing the reference intensity of radiation of a laser. That is, if the recording signal is varied from the L level to the H level, the reference voltage generator 3 starts outputting the reference voltage.

A laser output-monitoring unit 4 detects the intensity of radiation of the laser output from a laser luminous element 9 which will be described hereinafter, and starts outputting the monitoring voltage depending on the detected intensity of radiation.

A subtractor 5 subtracts the reference voltage from the monitoring voltage, and outputs a difference voltage depending on the subtracted result. A constant voltage generator generates and outputs a predetermined constant voltage. A signal selector alternatively outputs the constant voltage from the constant voltage generator 6 and the difference voltage from the subtractor 5. The signal selector 7 alternatively selects one of the constant voltage and the difference voltage based on the selection signal output from the wave forming unit 2. That is, the signal selector 7 selects the constant voltage if the selection signal becomes the H level, and selects the difference voltage if the selection signal becomes the L level.

The output of the signal selector 7 is input to the laser driver 8. The laser driver 8 outputs a laser driving current depending on the input signal. The laser luminous element 9 varies the intensity of radiation of the laser which is radiated depending on the laser driving current. Also, data for recording information on the optical disc is input to the laser driver 8, and the laser output by the laser luminous element 9 is turned on/off by the received data.

Now, the operation of the recording device of the present invention will be explained with reference to FIG. 2.

If the recording signal output from the recording signal generator 1 is varied from the L level to the H level, the information recording is started on the optical disc. That is, the reference voltage generator 3 starts outputting the reference voltage, if the recording signal is varied from the L level to the H level. The subtractor 5 subtracts the reference voltage output from the reference voltage generator 3 from the monitoring voltage output from the laser output monitoring unit 4, and outputs the difference voltage depending on the subtracted result.

Since the wave forming unit 2 outputs the H level for a predetermined time after the recording of the information has just started, the signal selector 7 selects the constant voltage output from the constant voltage generator 6 during the predetermined duration after the recording of the information has just started, and then selects the difference voltage output from the subtractor 5 afterward. Accordingly, the constant voltage is input to the laser driver 8 during the predetermined duration after the recording has just started, and then selects the difference voltage afterward.

Next, the laser driver 8 forwards the constant driving current to the laser luminous element 9 during the predetermined duration after the recording has just started, and forwards the driving current which varies depending on the difference voltage afterward. So, the laser luminous element 9 is driven by the constant driving current during the predetermined duration after the recording has just started, and then is controlled by the constant intensity of radiation afterward. Thus, the laser luminous element 9 is driven so that the laser is controlled so as to have a constant intensity of radiation after the predetermined duration.

As described above, the intensity of radiation of the laser beam radiated by the laser luminous element 9 is not constantly controlled as a constant during the predetermined duration after the recording has just started, i.e., until the operation of the feedback is at a stable state. However, errors in recording the information or the non recording of the information can be prevented during the predetermined duration after the recording has just started, when the constant voltage generated in the constant voltage generator 6 is determined in a manner that the intensity of radiation of the laser radiated in the laser luminous element 9 is larger than the intensity of radiation which is necessary in recording information on the optical disc.

In the present invention, the recording of information is achieved by forming marks on the optical disc. Weak laser radiation forms an incomplete mark or a missing mark. Errors in recording, in which an incomplete mark that cannot be read correctly, and non recording of the information, in which there is a missing mark, due to the weak radiation, are avoided due to the fact that the intensity of radiation of the laser beam is larger than the radiation which is necessary in recording the information on the optical disc.

Also, while the temperature within the recording device for recording information on the optical disc the characteristic of the laser luminous element 9 is varied, if the constant voltage output from the constant voltage generator 6 is corrected depending on the temperature, the probability of errors occurring in recording the information or the non recording of the information can be decreased within the predetermined time after the recording has just started.

The correction is performed by monitoring the laser driving current for performing the OPC (Optimum Power Control) operation as an example. Here, the OPC is an operation for determining the optimized intensity of radiation of the laser by performing a testing record while the intensity of radiation of the laser varies within a predetermined area of the optical disc, as mentioned previously. At this stage, the laser driving current for obtaining the optimized intensity of radiation of the laser can be detected.

Figure 3:
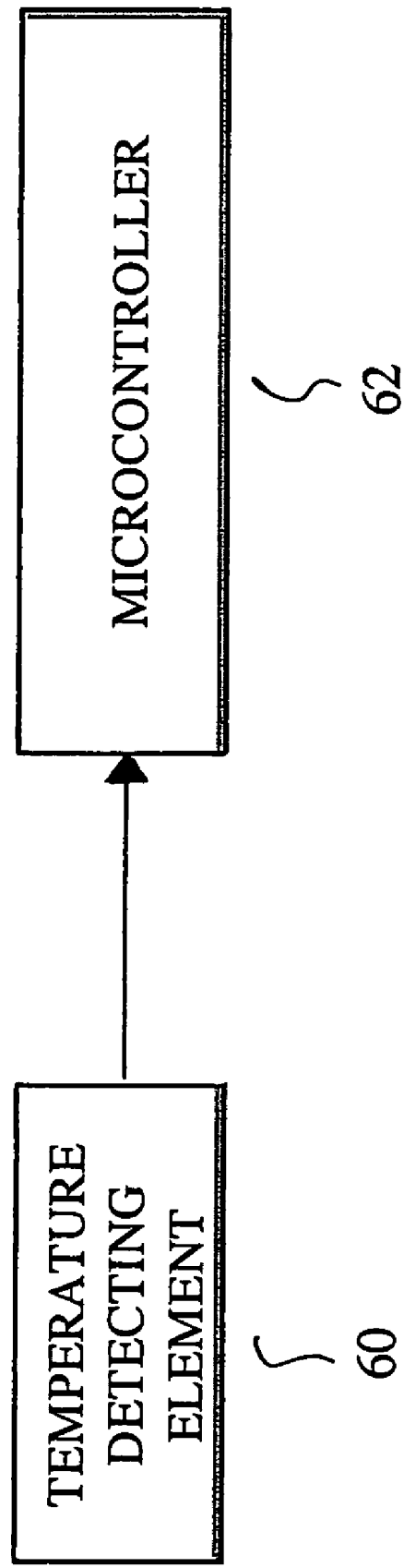
FIG. 3 is a block diagram of a temperature detector and microcontroller of the device for recording information shown in FIG. 2.

The temperature may vary from an initial time. In this case, radiation may be weak through the same level of constant voltage as the initial time. In the present invention, the temperature is monitored, and the OPC is performed and the level of the constant voltage is redetermined if necessary. This operation occurs before the starting of the (second, third, . . . ) recording of the information. Generally, the OPC is performed before the recording of the information has started on the optical disc, and if the difference of the inner temperature of the recording device from an OPC target temperature is more than a predetermined value, by monitoring the inner temperature of the recording device using a temperature detector, the OPC is performed again. As shown in FIG. 3, a temperature detecting element 60 detects the inner temperature of the recording device. A microcontroller 62 receives and processes the detected inner temperature to determine the difference with the OPC target temperature. The temperature detecting element 60 and the microcontroller 62 form a temperature detector. Accordingly, a most suitable value for the voltage generated by the constant voltage generator 6 can be determined.

According to the present invention, neither errors in recording the information on the optical disc or the non recording of the information (formation of non-recording areas) occur, thereby improving a recording quality on the optical disc after the recording has just started, since the intensity of radiation of the laser recording the information on the optical disc after the recording has just started has reached the necessary intensity.

While the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for recording information on a disc; comprising:
   a luminous element radiating a light for recording the information on the disc; and
   a controller controlling an intensity of radiation of the light based on a constant voltage for a predetermined period of time from a time the recording of the information to the disc starts,
   wherein the constant voltage is determined so that the intensity of the radiation of the laser is greater than an intensity of radiation necessary to record the information on the disc.

2. The device of claim 1, further comprising a temperature sensor sensing a temperature within the device, wherein a level of the constant voltage is adjusted based on a sensed temperature.

3. The device of claim 2, wherein the controller determines an optimized intensity of the laser beam by performing a test recording while the intensity of laser beam is varied within a predetermined area of the disc, and wherein the controller uses the test recording to control adjustment of the constant voltage in response to the sensed temperature within the recording device.

4. A device for recording information on a disc, comprising:
   a luminous element radiating a light for recording the information on the disc; and
   a controller controlling an intensity of radiation of the light based on a constant voltage for a predetermined period of time from a time the recording of the information to the disc starts,
   wherein a level of the constant voltage is redetermined before the recording of the information starts.

5. A method of recording information on a disc, comprising:
   radiating a light for recording the information on the disc; and
   controlling an intensity of radiation of the light based on a constant voltage for a predetermined period of time from a time the recording of the information to the disc starts,
   wherein the constant voltage is determined so that the intensity of the radiation of the laser is greater than an intensity of radiation necessary to record the information on the disc.

6. The method of claim 5, further comprising sensing a temperature within the device, wherein, in the controlling, a level of the constant voltage is adjusted based on a sensed temperature.

7. The method of claim 6, wherein, in the controlling, an optimized intensity of the laser beam is determined by performing a test recording while the intensity of laser beam is varied within a predetermined area of the disc, and wherein the test recording is used to control adjustment of the constant voltage in response to the sensed temperature within the recording device.

8. A method of recording information on a disc, comprising:
   radiating a light for recording the information on the disc; and
   controlling an intensity of radiation of the light based on a constant voltage for a predetermined period of time from a time the recording of the information to the disc starts,
   wherein a level of the constant voltage is redetermined before the recording of the information starts.

* * * * *